(12) United States Patent
Chikayama et al.

(10) Patent No.: US 11,493,839 B2
(45) Date of Patent: Nov. 8, 2022

(54) PROJECTION IMAGE DISPLAY DEVICE

(71) Applicant: Panasonic Intellectual Property Management Co., Ltd., Osaka (JP)

(72) Inventors: Manabu Chikayama, Osaka (JP); Hiroyuki Terawaki, Osaka (JP); Kiyoko Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/386,217

(22) Filed: Jul. 27, 2021

(65) Prior Publication Data

US 2022/0035229 A1 Feb. 3, 2022

(30) Foreign Application Priority Data

Jul. 30, 2020 (JP) .............................. JP2020-129451

(51) Int. Cl.
  *G03B 21/16* (2006.01)
  *H04N 9/31* (2006.01)
  *G03B 21/28* (2006.01)
  *G03B 21/14* (2006.01)
  *G02B 27/14* (2006.01)

(52) U.S. Cl.
  CPC .......... *G03B 21/16* (2013.01); *H04N 9/3144* (2013.01); *G02B 27/14* (2013.01); *G03B 21/145* (2013.01); *G03B 21/28* (2013.01); *H04N 9/3105* (2013.01)

(58) Field of Classification Search
  CPC .............................. G03B 21/16; H04N 9/3144
  See application file for complete search history.

(56) References Cited

U.S. PATENT DOCUMENTS

| 6,394,608 | B1 * | 5/2002 | Shiraishi | .............. | H04N 9/3141 |
| | | | | | 353/57 |
| 6,416,183 | B1 * | 7/2002 | Colpaert | ................ | G02B 7/005 |
| | | | | | 353/101 |
| 6,582,083 | B2 * | 6/2003 | Shiraishi | .............. | H04N 9/3141 |
| | | | | | 353/57 |

(Continued)

FOREIGN PATENT DOCUMENTS

| JP | 5038043 | 10/2012 |
| JP | 2015-31769 | 2/2015 |

(Continued)

*Primary Examiner* — Bao-Luan Q Le
(74) *Attorney, Agent, or Firm* — Wenderoth, Lind & Ponack L.L.P.

(57) ABSTRACT

A projection image display device includes: an optical element that separates incident light into a first color light beam and a second color light beam, synthesizes the first color light beam and the second color light beam to generate synthetic light, and emits the synthetic light; a first display panel that reflects and modulates the first color light beam; a second display panel that reflects and modulates the second color light beam; a first heat dissipator that dissipates heat of the first display panel; a second heat dissipator that dissipates heat of the second display panel; a light shielding portion that blocks a part of the second color light beam reflected by the second display panel from traveling toward the first display panel; a light shield heat dissipator that dissipates heat of the light shielding portion; and a container. The second heat dissipator is disposed outside the container.

12 Claims, 11 Drawing Sheets

(56) References Cited

U.S. PATENT DOCUMENTS

| | | | | |
|---|---|---|---|---|
| 6,751,027 | B2* | 6/2004 | Van Den Bossche | H04N 9/3144 353/34 |
| 6,779,894 | B2* | 8/2004 | Shiraishi | H04N 9/3144 353/57 |
| 6,935,750 | B2* | 8/2005 | Shiraishi | G02F 1/133385 353/57 |
| 7,084,931 | B2* | 8/2006 | Tabuchi | G02B 5/003 348/E5.142 |
| 7,128,422 | B2* | 10/2006 | Shiraishi | G03B 21/16 353/57 |
| 7,341,354 | B2* | 3/2008 | Shiraishi | G03B 21/16 353/57 |
| 7,796,383 | B2* | 9/2010 | Kavanagh | G03B 21/16 165/185 |
| 7,938,543 | B2* | 5/2011 | Gerets | G03B 21/16 353/52 |
| 10,488,688 | B2* | 11/2019 | Aizawa | G02F 1/133308 |
| 10,599,023 | B2* | 3/2020 | Tang | G03B 21/16 |
| 10,873,730 | B2* | 12/2020 | Malfait | H04N 5/7441 |
| 11,036,119 | B2* | 6/2021 | Tsai | G03B 21/2033 |
| 2002/0033992 | A1* | 3/2002 | Den Bossche | G03B 33/12 359/291 |
| 2002/0131023 | A1* | 9/2002 | Shiraishi | G02F 1/133385 353/57 |
| 2002/0163625 | A1* | 11/2002 | Tabuchi | H04N 9/3144 348/E5.142 |
| 2003/0214636 | A1* | 11/2003 | Shiraishi | G03B 21/10 353/57 |
| 2005/0018143 | A1* | 1/2005 | Shiraishi | G03B 21/10 348/E5.143 |
| 2005/0248728 | A1* | 11/2005 | Shiraishi | G03B 21/10 353/57 |
| 2007/0040994 | A1* | 2/2007 | Shiraishi | H04N 9/3141 353/57 |
| 2008/0024733 | A1* | 1/2008 | Gerets | G03B 21/16 165/185 |
| 2009/0046425 | A1* | 2/2009 | Kavanagh | H04N 9/3144 361/695 |
| 2018/0364516 | A1* | 12/2018 | Aizawa | G02F 1/133308 |
| 2019/0179217 | A1* | 6/2019 | Tang | G03B 21/008 |
| 2019/0364250 | A1* | 11/2019 | Malfait | G02B 7/008 |
| 2021/0124245 | A1* | 4/2021 | Tsai | G03B 21/008 |

FOREIGN PATENT DOCUMENTS

| | | |
|---|---|---|
| JP | 2016-133609 | 7/2016 |
| WO | 02/19027 | 3/2002 |

* cited by examiner 50,60

PROJECTION IMAGE DISPLAY DEVICE

BACKGROUND

1. Technical Field

The present disclosure relates to a projection image display device, and more particularly relates to a cooling structure of the projection image display device.

2. Description of the Related Art

Japanese Patent No. 5038043 discloses a projection image display device for achieving a dust-proof effect and a cooling effect. The patent literature describes an image projection device in which a temperature rise in a space formed by an image display and an optical member disposed adjacent to the image display is reduced and in which dust is prevented from entering, and in addition, a projected image has a good contrast.

SUMMARY

In a case where display panels are prepared each for respective ones of separated color light beams to generate image light of each color light beam, a part of the image light generated by a certain display panel becomes stray light and heats a periphery of another display panel. This heating causes unevenness of a temperature distribution of the display panel, so that a display performance of the display panel deteriorates. In addition, it is necessary to take a dust-proof measure so that neither dust nor dirt adheres to the display panels.

An object of the present disclosure is to provide a projection image display device that can reduce unevenness of a temperature distribution of a display panel irradiated with stray light, and at the same time, can make the display panel dust proof.

A projection image display device of the present disclosure includes: an optical element that separates incident light into a first color light beam and a second color light beam, synthesizes the first color light beam and the second color light beam to generate synthetic light, and emits the synthetic light; a first display panel that reflects and modulates the first color light beam; a second display panel that reflects and modulates the second color light beam; a first heat dissipator that dissipates heat of the first display panel; a second heat dissipator that dissipates heat of the second display panel; a light shielding portion that blocks a part of the second color light beam reflected by the second display panel from traveling toward the first display panel; a light shield heat dissipator that dissipates heat of the light shielding portion; and a container that hermetically contains the optical element, the first display panel, the second display panel, the light shielding portion, the first heat dissipator, and the light shield heat dissipator. The second heat dissipator is disposed outside the container.

The projection image display device of the present disclosure can reduce unevenness of a temperature distribution of the display panel irradiated with stray light, and at the same time, can make the display panel dust proof.

DETAILED DESCRIPTION

Hereinafter, an exemplary embodiment will be described in detail with appropriate reference to the drawings. However, an unnecessarily detailed description will be omitted in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventors (or inventor) provide the accompanying drawings and the following description to help those skilled in the art to sufficiently understand the present disclosure, but do not intend to use the drawings or the description to limit the subject matters of the claims.

(Exemplary Embodiment)

Hereinafter, an exemplary embodiment will be described with reference to FIGS. 1 to 9. In the present disclosure, the term image includes a still image and a moving image.

[1-1. Configuration]

[1-1-1. Overall Configuration]

Figure 1:
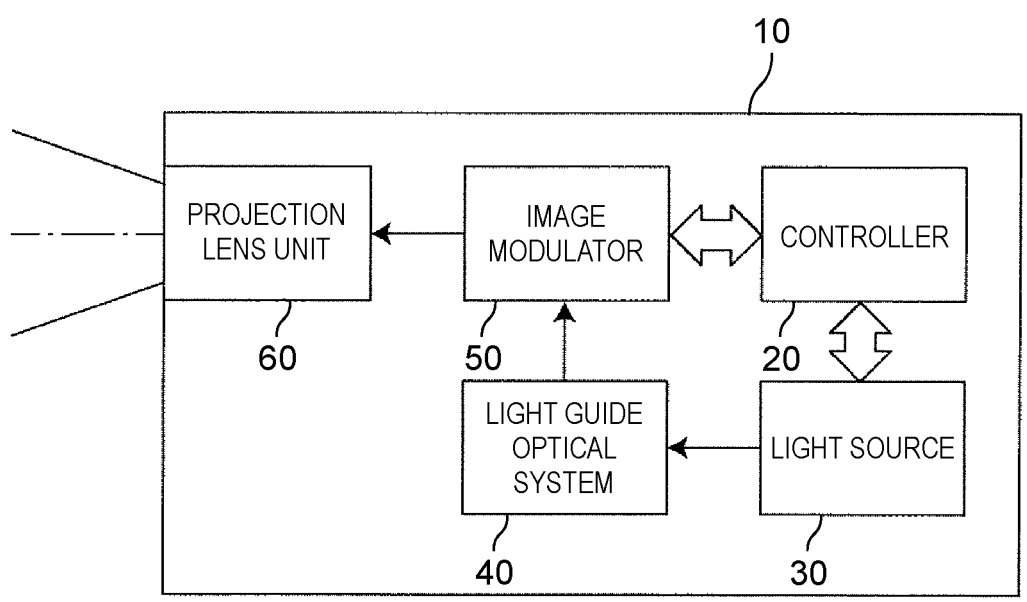
FIG. 1 is a block diagram illustrating an overall configuration of a projection image display device according to an exemplary embodiment.

Refer to FIG. 1. FIG. 1 is a diagram for describing a configuration of an optical system of projection image display device 10 of the present disclosure.

Projection image display device 10 includes: light source 30 that emits light; light guide optical system 40 that guides the light emitted from light source 30 to image modulator 50; image modulator 50 that gives image information to incident light and emits the light as image light; projection lens unit 60 that projects incident image light; and controller 20 that controls light source 30 and image modulator 50.

Light source 30 includes, for example, a laser light source that is an excitation light source, and emits white light. Light source 30 generates white light from blue laser light emitted from the laser light source by using a dichroic mirror, a phosphor wheel device, or the like, for example.

Light guide optical system 40 guides the light emitted from light source 30 to image modulator 50. Light guide optical system 40 is configured with, for example, a plurality of lenses.

Image modulator 50 separates incident white light into a red light beam, a green light beam, and a blue light beam, modulates each light beam according to image information from controller 20, and synthesizes again the image light beam of each color generated by modulation and emits the synthesized light.

Projection lens unit 60 enlarges and projects the image light emitted from image modulator 50. Projection lens unit 60 is configured with a plurality of lenses.

Controller 20 controls a light amount and an emission timing of the light emitted from light source 30. Further, controller 20 controls modulation of the color light beams performed by image modulator 50. Controller 20 can be implemented by semiconductor elements or other components. Controller 20 may be configured with, for example, a microcomputer, a central processing unit (CPU), a microprocessor unit (MPU), a graphics processor unit (GPU), a digital signal processor (DSP), a field-programmable gate array (FPGA), or an application specific integrated circuit (ASIC). A function of controller 20 may be constituted only by hardware or may be achieved by a combination of hardware and software. Controller 20 includes a storage such as a hard disk (HDD), a solid state disk (SSD), or a memory, and achieves a predetermined function by reading data and programs stored in the storage and executing various arithmetic processing.

Figure 2:
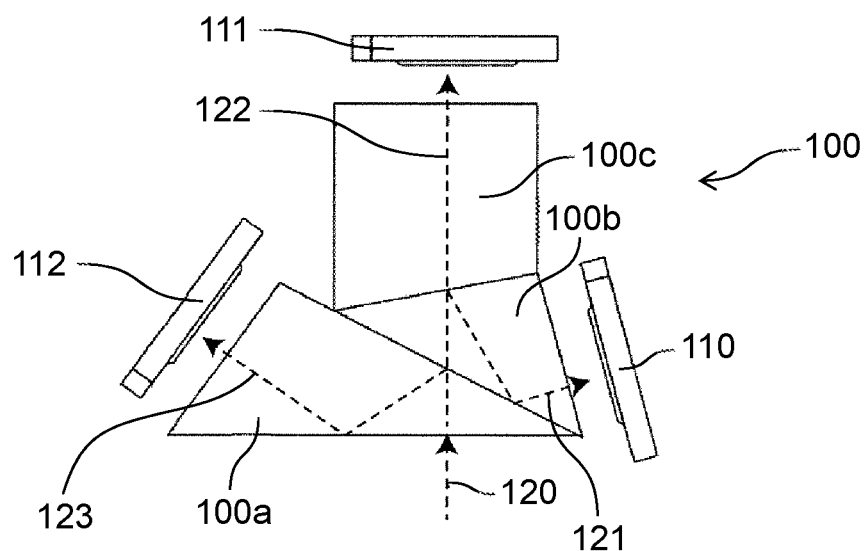
FIG. 2 is a plan view illustrating an incident axis of light in an image modulator according to the exemplary embodiment.

Next, a configuration of an optical system of image modulator 50 will be described with reference to FIG. 2. FIG. 2 is a plan view for describing incidence of light in image modulator 50 according to the exemplary embodiment.

Image modulator 50 includes dichroic prism 100, first display panel 110, second display panel 111, and third display panel 112. Dichroic prism 100 separates incident white light into the red light beam, the green light beam, and the blue light beam, and further combines the red light beam, the green light beam, and the blue light bean modulated in the respective ones of first display panel 110 to third display panel 112.

Each of first display panel 110 to third display panel 112 is a reflective image display that modulates and reflects incident light, and is a digital micromirror device (DMD), for example. The DMD includes a plurality of micromirrors corresponding to pixels. Turning of the micromirrors as display elements is controlled by controller 20 in accordance with the image content. As the reflective image display, a liquid crystal panel may be adopted other than the DMD.

Dichroic prism 100 (an example of an optical element) is configured with, for example, first prism 100a, second prism 100b, and third prism 100c. A dichroic layer is provided on each of boundary surfaces between the prisms. Light having entered dichroic prism 100 is separated at the dichroic layers, and the separated light is reflected by each of first display panel 110 to third display panel 112 and is then synthesized in the dichroic layers.

Regarding white incident light 120 entering dichroic prism 100, blue incident light 123 is separated by being reflected by the boundary surface between first prism 100a and second prism 100b. Separated blue incident light 123 is reflected inside first prism 100a and enters third display panel 112.

The light from which blue incident light 123 is separated at the boundary surface between first prism 100a and second prism 100b is separated into red incident light 121 and green incident light 122 at a boundary surface between second prism 100b and third prism 100c. Red incident light 121 separated by being reflected by the boundary surface between second prism 100b and third prism 100c is reflected inside second prism 100b and then enters first display panel 110.

Green incident light 122 separated at the boundary surface between second prism 100b and third prism 100c travels straight in third prism 100c and enters second display panel 111.

Figure 3:
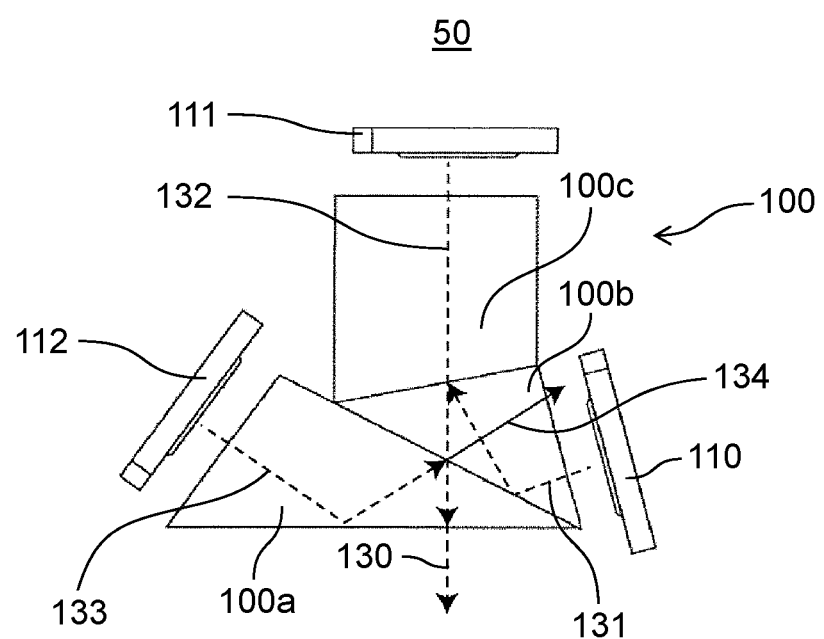
FIG. 3 is a plan view illustrating an exit axis of light in the image modulator according to the exemplary embodiment.

Next, with reference to FIG. 3, a description will be given on synthesis of light separated by dichroic prism 100 and reflected by the display panels. FIG. 3 is a plan view for describing emission of light in image modulator 50 according to the exemplary embodiment.

Green reflected light 132 reflected by second display panel 111 enters third prism 100c and travels straight. Red reflected light 131 reflected by first display panel 110 enters second prism 100b, is reflected inside second prism 100b, is reflected by the boundary surface between second prism 100b and third prism 100c, and is then synthesized with green reflected light 132.

Blue reflected light 133 reflected by third display panel 112 is reflected inside first prism 100a, is reflected by the boundary surface between first prism 100a and second prism 100b, and is then synthesized with red reflected light 131 and green reflected light 132 to generate white reflected light 130 (synthetic light). White reflected light 130 is emitted from dichroic prism 100 and enters projection lens unit 60.

At the boundary surface between first prism 100a and second prism 100b, a part of blue reflected light 133 travels straight, and a part of green reflected light 132 is reflected, so that stray light 134 is generated. Stray light 134 travels to first display panel 110 and is applied to a side of first display panel 110 facing dichroic prism 100. Applied stray light 134 increases a temperature of a part of first display panel 110 facing dichroic prism 100 except the display elements (micromirrors). Therefore, a temperature difference is generated between the side facing dichroic prism 100 and the opposite side of first display panel 110, and at the same time, a temperature of first display panel 110 itself is raised.

Further, first display panel 110 to third display panel 112 generate heat because the display elements are driven at high speed. A cooling device is required to cool the temperature raised by the stray light and the driving of the display elements. When dust adheres to surfaces of first display panel 110 to third display panel 112, the reflected light of each color becomes dark. Therefore, a dust-proof structure is required to prevent dust from entering first display panel 110 to third display panel 112.

[1-1-2. Configuration of Main Part]

Figure 4:
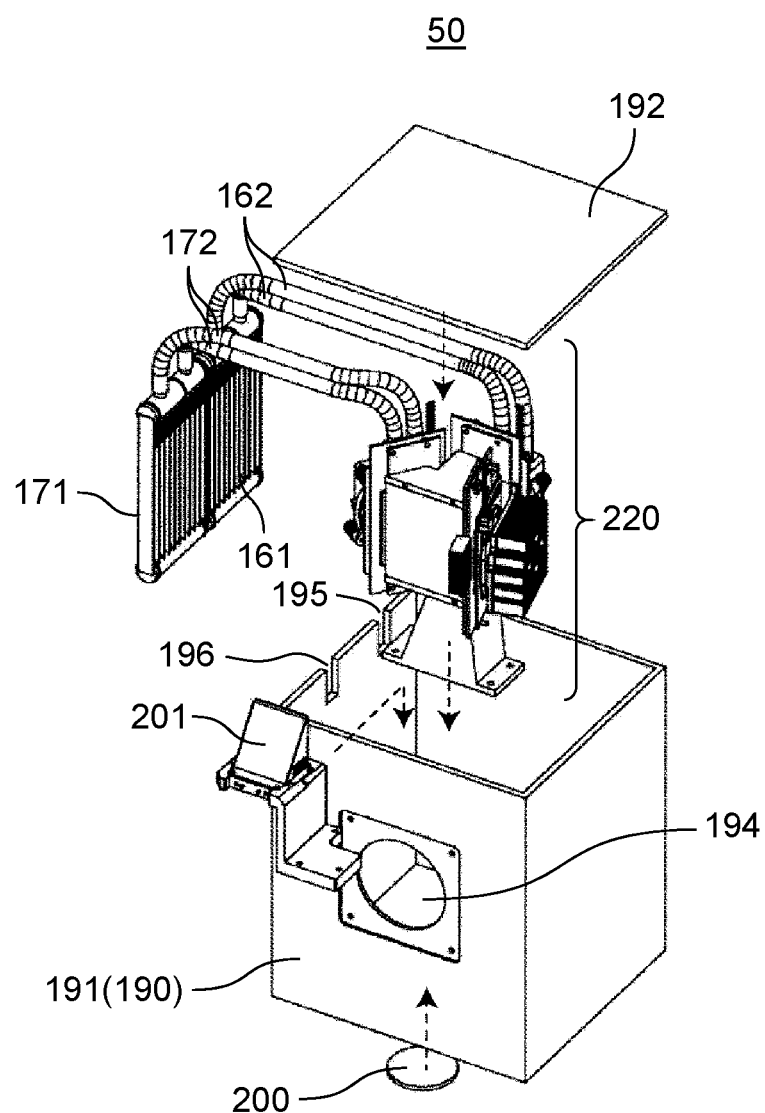
FIG. 4 is a perspective view illustrating a configuration of a display panel block contained in a container according to the exemplary embodiment.
Figure 5:
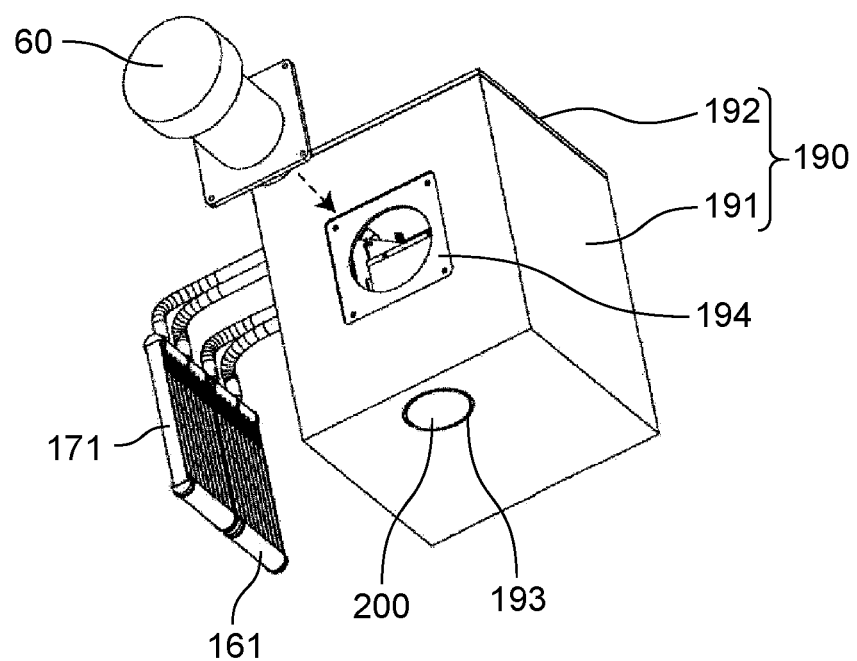
FIG. 5 is an outer appearance perspective view of the container containing the image modulator according to the exemplary embodiment.

Next, with reference to FIGS. 4 and 5, a description will be given on a cooling structure and a dust-proof structure of image modulator 50. FIG. 4 is a perspective view illustrating a configuration of display panel block 220 contained in container 190 according to the exemplary embodiment. FIG. 5 is an outer appearance perspective view of container 190 that contains image modulator 50 according to the exemplary embodiment.

Image modulator 50 includes display panel block 220, lens 200, optical transmitter 201, and container 190.

Container 190 includes container body 191 and lid 192. Lid 192 is fastened to container body 191 via a sealing member such as an O-ring. Display panel block 220 and optical transmitter 201 are also fastened to container body 191. Light entrance opening 193 is provided on a bottom surface of container body 191, and the following openings are provided on a side surface: light exit opening 194;

opening 195 through which second heat transport portion 162 passes; and opening 196 through which third heat transport portion 172 passes.

Lens 200 is attached to light entrance opening 193 of container 190. Projection lens unit 60 is attached to light exit opening 194 of container 190. A seal member is provided also between opening 195 of container 190 and second heat transport portion 162 and between opening 196 of container 190 and third heat transport portion 172. As described above, container 190 has a dust-proof structure, which prevents air from entering a space in container 190 from outside.

The light transmitted from light guide optical system 40 enters inside of container 190 through lens 200 and enters display panel block 220 through optical transmitter 201. The light modulated by display panel block 220 enters projection lens unit 60 through light exit opening 194.

Figure 6:
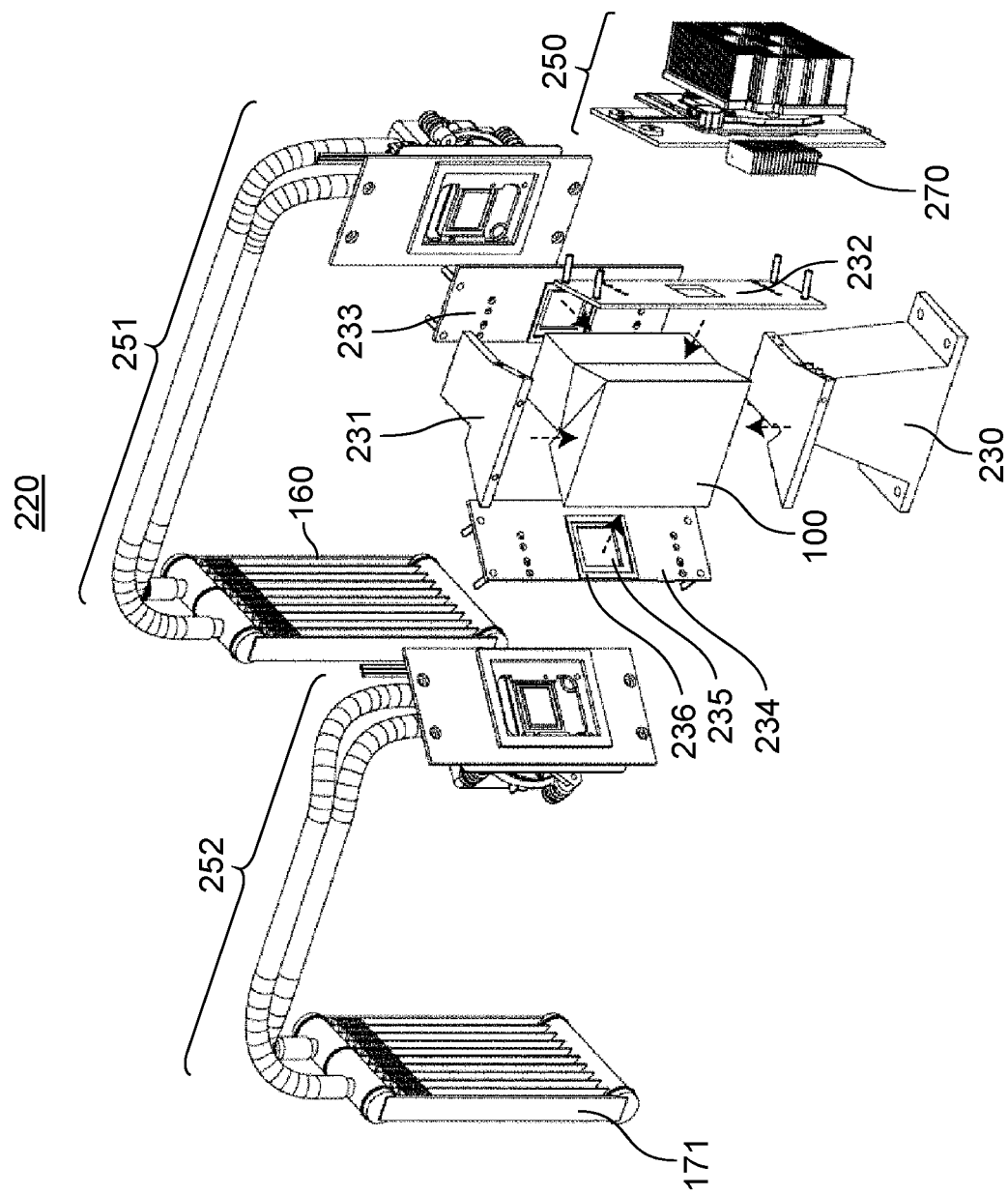
FIG. 6 is an exploded perspective view of the display panel block according to the exemplary embodiment.

Next, refer to FIG. 6. FIG. 6 is an exploded perspective view of display panel block 220 according to the exemplary embodiment.

Display panel block 220 is configured with dichroic prism 100, bottom surface holder 230, top surface holder 231, side surface holders 232, 233, 234, first display panel block 250, second display panel block 251, and third display panel block 252.

Bottom surface holder 230 is bonded to a bottom surface of dichroic prism 100 to hold dichroic prism 100. Top surface holder 231 is bonded to a top surface of dichroic prism 100 to hold dichroic prism 100. Bottom surface holder 230 and top surface holder 231 each hold three side surface holders 232, 233, 234.

Side surface holder 232 holds first display panel block 250, side surface holder 233 holds second display panel block 251, and side surface holder 234 holds third display panel block 252.

Each of side surface holders 232, 233, 234 is provided with opening 235 through which light passes between dichroic prism 100 and each of first display panel block 250 to third display panel block 252. Dust-proof member 236 is disposed around each opening 235 to prevent dust from adhering to the surfaces of dichroic prism 100 and first display panel 110 to third display panel 112. Dust-proof members 236 are sheet members such as acrylic transparent sheets.

Figure 7:
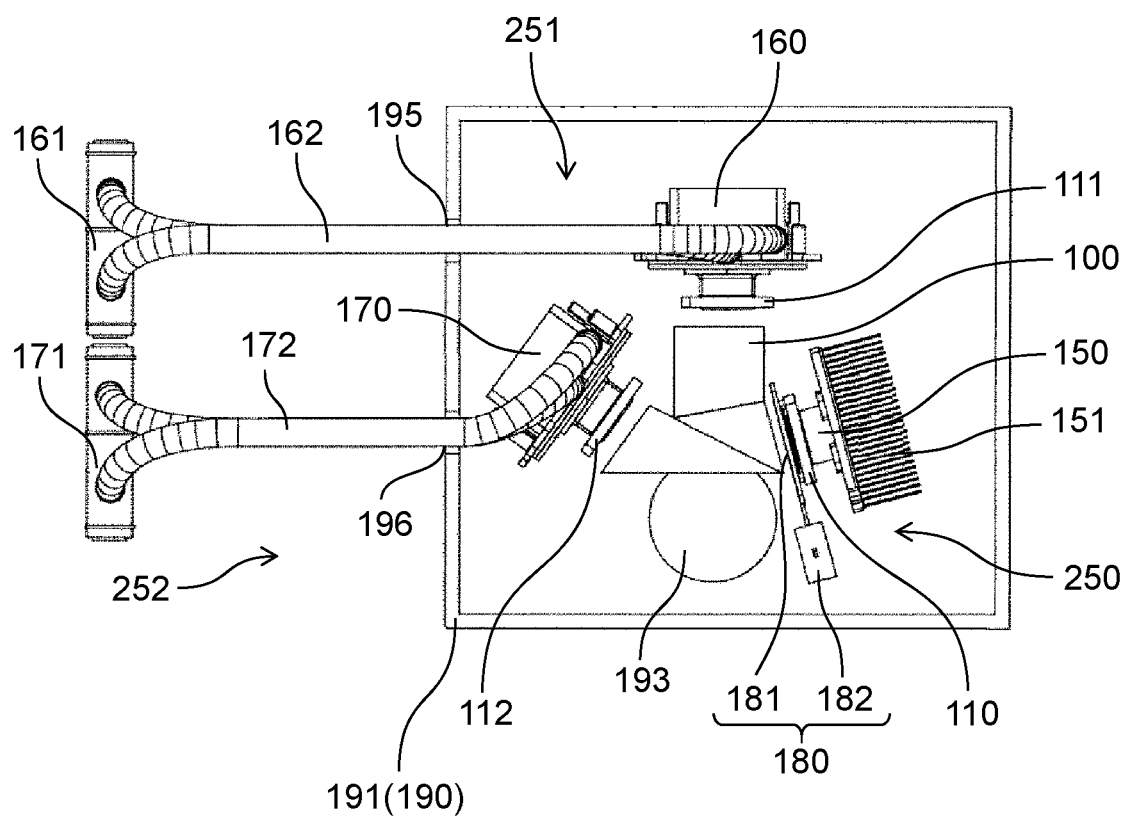
FIG. 7 is a plan view illustrating the image modulator according to the exemplary embodiment when a lid of the container is opened.

Next, a configuration of each display panel block will be described with reference to FIG. 7. FIG. 7 is a plan view illustrating image modulator 50 according to the exemplary embodiment when lid 192 of container 190 is opened.

First display panel block 250 includes first display panel 110, first heat receiver 150, first heat dissipator 151, and light shielding unit 180. Second display panel block 251 includes second display panel 111, second heat receiver 160, second heat dissipator 161, and second heat transport portion 162. Third display panel block 252 includes third display panel 112, third heat receiver 170, third heat dissipator 171, and third heat transport portion 172.

Light shielding unit 180 of first display panel block 250 includes light shielding portion 181 and light shield heat dissipator 182. Light shielding portion 181 is disposed between first display panel 110 and dichroic prism 100. Light shielding portion 181 blocks at least a part of stray light traveling toward first display panel 110. Light shielding portion 181 is attached to a surface (front surface) of first display panel 110 facing dichroic prism 100.

Light shield heat dissipator 182 is coupled to light shielding portion 181 to release heat of light shielding portion 181 into surrounding air.

First heat receiver 150 is attached to a surface (rear surface) of first display panel 110 opposite to dichroic prism 100. First heat receiver 150 absorbs heat of first display panel 110.

First heat dissipator 151 is attached to a surface of first heat receiver 150 opposite to first display panel 110. First heat dissipator 151 dissipates heat of first heat receiver 150. Therefore, first heat dissipator 151 dissipates the heat of first display panel 110 via first heat receiver 150.

In second display panel block 251, second heat receiver 160 is attached to a surface of second display panel 111 opposite to dichroic prism 100. Second heat receiver 160 absorbs heat of second display panel 111.

Second heat receiver 160 is coupled to second heat dissipator 161 via second heat transport portion 162. Second heat transport portion 162 transfers heat of second heat receiver 160 to second heat dissipator 161. Second heat dissipator 161 dissipates the heat of second heat receiver 160 via second heat transport portion 162.

In third display panel block 252, third heat receiver 170 is attached to a surface of third display panel 112 opposite to dichroic prism 100. Third heat receiver 170 absorbs heat of third display panel 112.

Third heat receiver 170 is coupled to third heat dissipator 171 via third heat transport portion 172. Third heat transport portion 172 transfers heat of third heat receiver 170 to third heat dissipator 171. Third heat dissipator 171 dissipates the heat of third heat receiver 170 via third heat transport portion 172.

Container 190 contains therein dichroic prism 100, first display panel 110, first heat receiver 150, first heat dissipator 151, light shielding portion 181, light shield heat dissipator 182, second display panel 111, second heat receiver 160, third display panel 112, and third heat receiver 170.

Second heat dissipator 161 and third heat dissipator 171 are disposed to be exposed outside container 190. Second heat receiver 160 inside container 190 and second heat dissipator 161 disposed outside container 190 are coupled through second heat transport portion 162. In addition, third heat receiver 170 inside container 190 and third heat dissipator 171 disposed outside container 190 are coupled through third heat transport portion 172.

Second heat transport portion 162 circulates a heat medium between second heat receiver 160 and second heat dissipator 161 by a fan or a pump (not shown). The heat medium may be gas or liquid. Second heat transport portion 162 includes, for example, two pipes. The heat medium that has absorbed heat from second heat receiver 160 release the heat from the second heat dissipator through one pipe of second heat transport portion 162, and the heat medium whose temperature has decreased returns to second heat receiver 160 through the other pipe of second heat transport portion 162. Similarly, third heat transport portion 172 also circulates a heat medium between third heat receiver 170 and third heat dissipator 171 by a fan or a pump (not shown). Second heat dissipator 161 and third heat dissipator 171 are radiators, for example, in a case of liquid cooling, or include a plurality of fin tubes, for example, in a case of air cooling.

Figure 8:
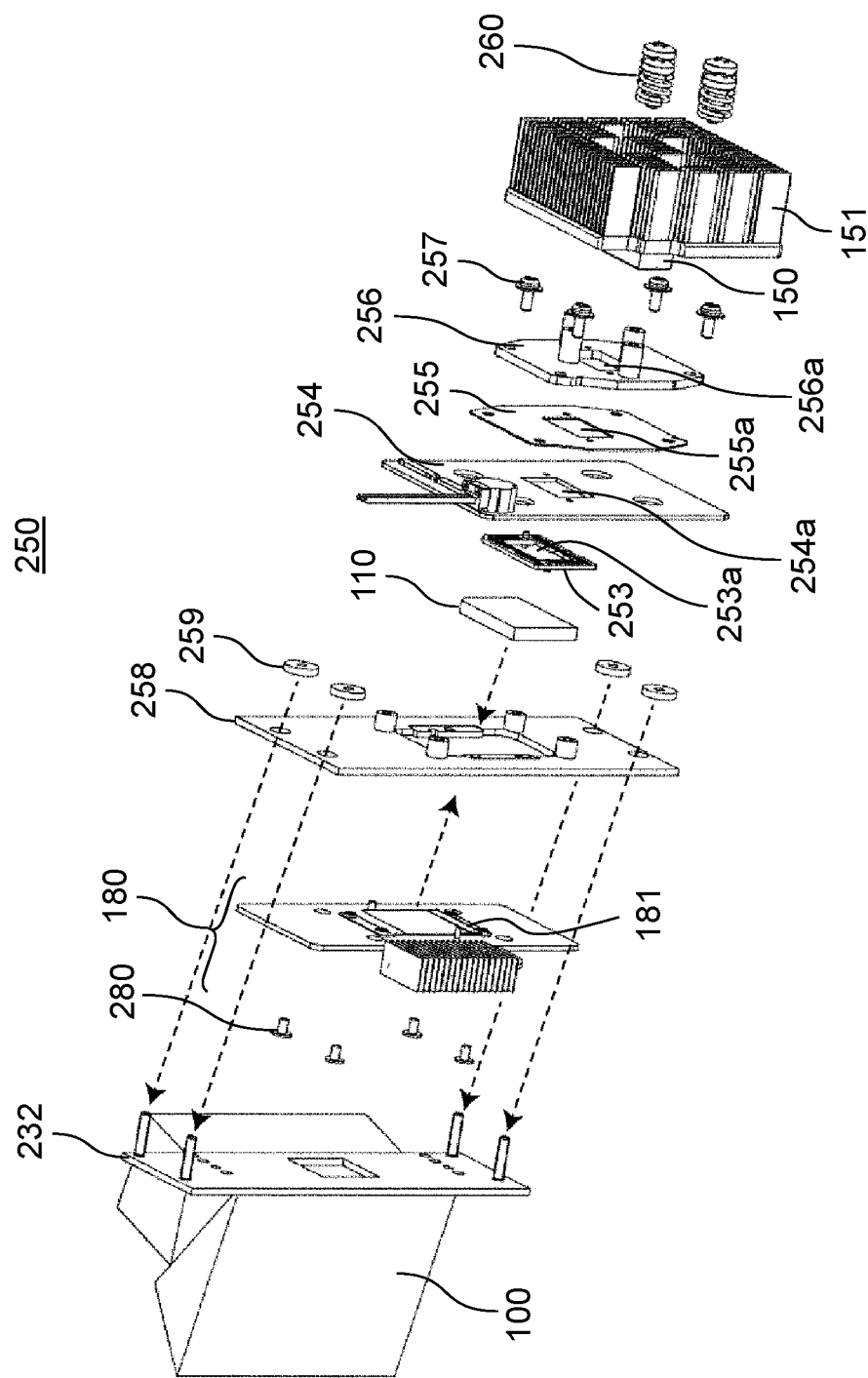
FIG. 8 is an exploded perspective view illustrating a configuration of the display panel block according to the exemplary embodiment.

Next, a configuration of first display panel block 250 will be described in detail with reference to FIG. 8. FIG. 8 is an exploded perspective view illustrating the configuration of first display panel block 250.

First display panel block 250 further includes panel holder 258, interposer 253, circuit board 254, insulating member 255, and heat dissipation portion holder 256. There are disposed in order, from side surface holder 232 disposed in the vicinity of dichroic prism 100: light shielding unit 180, panel holder 258, first display panel 110, interposer 253, circuit board 254, insulating member 255, heat dissipation portion holder 256, first heat receiver 150, and first heat dissipator 151. Hereinafter, a surface of each of these members facing dichroic prism 100 is referred to as a front surface, and a surface opposite to the front surface is referred to as a rear surface.

First display panel 110 is fixedly and electrically connected to circuit board 254 by interposer 253 in a rear surface direction. Heat dissipation portion holder 256 is disposed from circuit board 254 in a rear surface direction of first display panel 110 via insulating member 255.

First heat receiver 150 is, for example, a heat receiving metal in a block shape. First heat dissipator 151 is, for example, a heat dissipation fin and releases the heat of first heat receiver 150 into air in container 190. First heat receiver 150 and first heat dissipator 151 are integrally formed and are fixed to heat dissipation portion holder 256 with bolts 260. First heat dissipator 151 is connected to a surface of first display panel 110 in a direction away from dichroic prism 100, in other words, is connected to the rear surface of first display panel 110 via first heat receiver 151. Therefore, driving heat of first display panel 110 is directly transferred to first heat dissipator 151.

Openings 253a, 254a, 255a, 256a are respectively provided at central portions of interposer 253, circuit board 254, insulating member 255, and heat dissipation portion holder 256. First heat receiver 150 passes through these openings to be in direct contact with the rear surface of first display panel 110. This arrangement enables first heat receiver 150 to absorb heat generated by driving micromirrors corresponding to pixels of first display panel 110.

Circuit board 254 supporting first display panel 110, insulating member 255, and heat dissipation portion holder 256 supporting first heat dissipator 151 are fixed to a rear surface side of panel holder 258 with bolts 257. Light shielding unit 180 is fixed to a front surface side of panel holder 258 with bolts 280. Panel holder 258 is fixed to a rear surface side of side surface holder 232 with an adhesive 259.

Second display panel block 251 and third display panel block 252 respectively include, instead of first heat dissipator 151 of first display panel block 250, second heat dissipator 161 and third heat dissipator 171 to dissipate heat by means of a heat transport member using liquid cooling, a heat pipe, or the like. Second heat dissipator 161 and third heat dissipator 171 are disposed outside container 190. In second display panel block 251 and third display panel block 252, light shielding portion 181 may be omitted. The other components of second display panel block 251 and third display panel block 252 are components similar to those of first display panel block 250.

Figure 9:
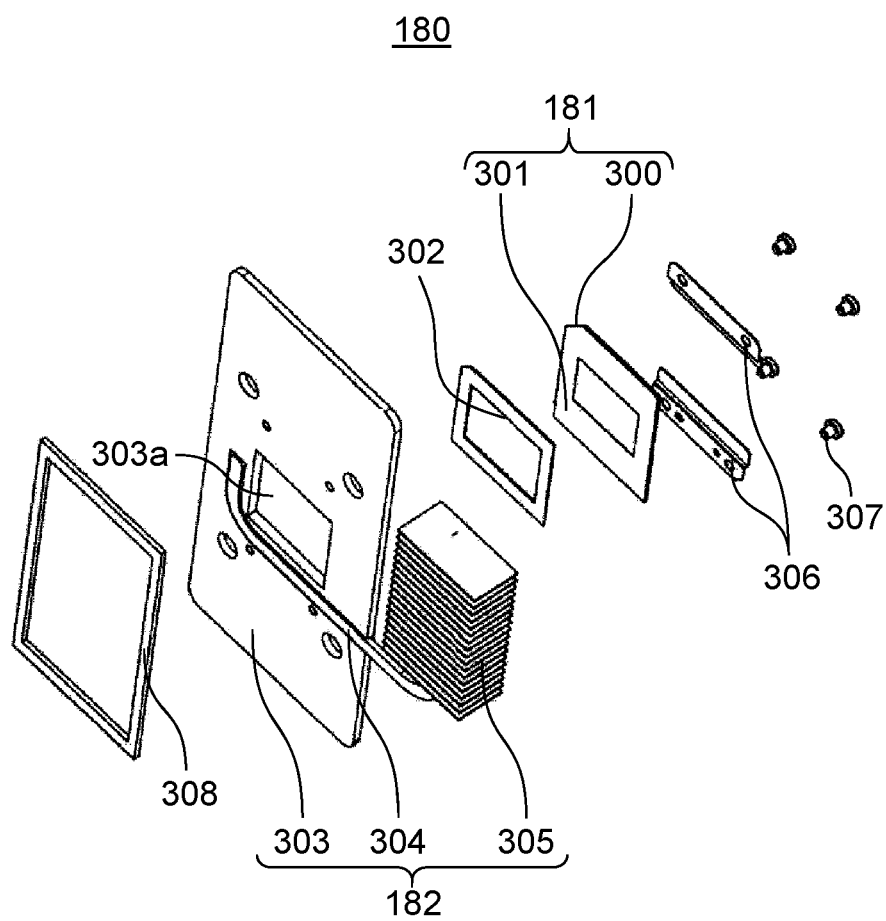
FIG. 9 is an exploded perspective view of a light shielding portion according to the exemplary embodiment.

Next, with reference to FIG. 9, a configuration of light shielding unit 180 will be described. FIG. 9 is an exploded perspective view of light shielding unit 180 according to the exemplary embodiment.

Light shielding unit 180 includes light shielding portion 181, light shield heat dissipator 182, heat dissipation sheet 302, and dust-proof member 308. There are disposed, in order from dichroic prism 100: dust-proof member 308, light shield heat dissipator 182, heat dissipation sheet 302, and light shielding portion 181.

Light shielding portion 181 includes transparent member 300 in a plate shape and light shielding mask 301 formed on a surface of transparent member 300. Transparent member 300 is made of a material having such a high transmittance that a color light beam to first display panel 110 and a color light beam from first display panel 110 pass through transparent member 300, and transparent member 300 is configured with, for example, glass made of TEMPAX Float (registered trademark) or sapphire.

Light shielding mask 301 is configured to be a thin film that absorbs stray light toward first display panel 110. Light shielding mask 301 is a metal film or a dielectric film having a thickness of about several μm. The metal film is, for example, a multilayer film of chromium, but other metals may be used. The metal film is formed by, for example, a vapor deposition method or a sputtering method. The dielectric film is, for example, a silicon-based film.

Light shielding portion 181 is supported by holding member 306 via heat dissipation sheet 302 and is attached to metal plate 303 of light shield heat dissipator 182. Holding member 306 is, for example, a sheet metal made of metal, and is fixed to a rear surface of metal plate 303 with bolts 307.

Light shield heat dissipator 182 includes metal plate 303, heat transport portion 304, and heat dissipation fin 305. Metal plate 303 serving as a first light shield heat sink absorbs heat absorbed by light shielding mask 301 of light shielding portion 181 through heat dissipation sheet 302, and metal plate 303 releases the heat into surrounding air. Opening 303a through which a color light beam passes is provided at a central part of metal plate 303.

One end of heat transport portion 304 is attached on a front surface side of metal plate 303, and heat dissipation fin 305 serving as a second light shield heat sink is connected to the other end of heat transport portion 304. Heat of metal plate 303 is transferred to heat dissipation fin 305 through heat transport portion 304 and is released from heat dissipation fin 305 into surrounding air. Heat transport portion 304 is, for example, a heat pipe. As described above, since light shield heat dissipator 182 includes heat transport portion 304 and heat dissipation fin 305, heat dissipation efficiency can be improved. However, when an amount of heat due to stray light can be sufficiently dissipated only by metal plate 303, heat transport portion 304 and heat dissipation fin 305 may be omitted.

Heat transport portion 304 is disposed along a region of metal plate 303 irradiated with stray light. Specifically, heat transport portion 304 is disposed to extend along a periphery of opening 303a of metal plate 303. When opening 303a has, for example, a rectangular shape, heat transport portion 304 is disposed along a short side (an example of a first side) and a long side (an example of a second side) of opening 303a. The region of metal plate 303 irradiated with stray light is opening 303a through which a color light beam passes and is a peripheral region of opening 303a. Therefore, by disposing heat transport portion 304 in the peripheral region of opening 303a, heat transport portion 304 is directly irradiated with stray light, so that a heat dissipation efficiency can be improved.

Metal plate 303 is in contact with side surface holder 232 via dust-proof member 308. As a result, metal plate 303 can be brought into close contact with side surface holder 232, and the surface of transparent member 300 can therefore be dust-proof. Dust-proof member 308 is made of a material having cushioning properties and is made of, for example, silicone rubber. At the time of assembly, position adjustment is performed by three-dimensionally moving each of first display panel 110 to third display panel 112 such that images of first display panel 110 to third display panel 112 overlap each other with high accuracy. Since dust-proof member 308 has cushioning properties, the positions of first display panel 110 to third display panel 112 can be easily adjusted.

First heat dissipator 151 for dissipating the driving heat of first display panel 110 and light shield heat dissipator 182 for dissipating the heat of light shielding portion 181 release heat into the air in the same container. Therefore, a temperature difference between first heat dissipator 151 and light shield heat dissipator 182 can be reduced. In addition, light shielding portion 181 reduces heat generation on a front surface of first display panel 110. Further, since the heat of first display panel 110 is transferred to transparent member 300 of light shielding portion 181 through an air layer, a temperature rise of the front surface of first display panel 110 is reduced, and a temperature difference between the front surface and the rear surface is further reduced.

[1-2. Advantageous Effects and the Like]

As described above, projection image display device 10 according to the present exemplary embodiment includes: dichroic prism 100 that separates incident light into a plurality of different color light beams, synthesizes the separated color light beams, and emits the synthesized light beam; and first display panel 110 that reflects and modulates the red incident light beam separated by dichroic prism 100. Projection image display device 10 includes: second display panel 111 that reflects and modulates the green light beam separated by dichroic prism 100; first heat dissipator 151 that dissipates the heat of first display panel 110; and second heat dissipator 161 that dissipates the heat of second display panel 111. Projection image display device 10 includes: light shielding portion 181 that blocks a part of the green reflected light reflected by second display panel 111 from traveling toward first display panel 110, and light shield heat dissipator 182 that dissipates the heat of light shielding portion 181. Projection image display device 10 further includes container 190 that hermetically contains dichroic prism 100, first display panel 110, second display panel 111, light shielding portion 181, first heat dissipator 151, and light shield heat dissipator 182. Second heat dissipator 161 is disposed outside container 190.

In the present exemplary embodiment, light shielding portion 181 is provided on first display panel 110 on which the stray light from second display panel 111 enters. Since first heat dissipator 151 for dissipating the driving heat of first display panel 110 and light shield heat dissipator 182 for dissipating the heat of light shielding portion 181 release heat into the air in the same container, the temperature difference between first heat dissipator 151 and light shield heat dissipator 182 can be reduced. Therefore, it is possible to reduce the unevenness of the temperature distribution between a side of first display panel 110 facing light shield heat dissipator 182 and a side of first display panel 110 facing first heat dissipator 151. Further, since second heat dissipator 161 that dissipates the heat of second display panel 111, which is less affected by the stray light, is disposed outside container 190, it is possible to prevent the temperature in container 190 from excessively rising to cause malfunction of first display panel 110 and second display panel 111. In addition, first display panel 110 and second display panel 111 are contained in sealed container 190, so that first display panel 110 and second display panel 111 can be dust-proof.

Projection image display device 10 includes: third display panel 112 that reflects and modulates the blue light beam separated by dichroic prism 100; and third heat dissipator 171 that dissipates the heat of third display panel 112. Light shielding portion 181 of projection image display device 10 blocks a part of the blue reflected light reflected by third display panel 112 from traveling toward first display panel 110. Container 190 of projection image display device 10 hermetically contains third display panel 112, and third heat dissipator 171 is disposed outside container 190. Therefore, since light shielding portion 181 is provided on first display panel 110 where the stray light from third display panel 112 enters, light shielding portion 181 absorbs the stray light, and light shield heat dissipator 182 releases the heat generated by the stray light into the air in the container. As a result, the temperature difference between first heat dissipator 151 and light shield heat dissipator 182 can be reduced. Further, since third heat dissipator 171 that dissipates the heat of third display panel 112, which is less affected by the stray light, is disposed outside container 190, it is possible to prevent the temperature in container 190 from excessively rising to cause malfunction of first display panel 110 and third display panel 112. In addition, first display panel 110 and third display panel 112 are contained in sealed container 190, so that first display panel 110 and third display panel 112 can be dust-proof.

In the present exemplary embodiment, first display panel 110 is disposed between light shielding portion 181 and first heat dissipator 151, light shielding portion 181 is disposed on the front surface side of first display panel 110, and first heat dissipator 151 and the rear surface of first display panel 110 are connected to each other. Consequently, a temperature gap between the front surface and the rear surface of first display panel 110 can be reduced.

In the present exemplary embodiment, light shield heat dissipator 182 includes metal plate 303 and heat dissipation fin 305 that dissipate the heat of light shielding portion 181. Light shield heat dissipator 182 includes heat transport portion 304 that couples metal plate 303 and heat dissipation fin 305 to transport the heat of metal plate 303 to heat dissipation fin 305 by using heat transfer with a refrigerant or heat transfer by latent heat. A part of heat transport portion 304 is disposed along the region of metal plate 303 irradiated with the second color light beam reflected by second display panel 111. As a result, since heat transport portion 304 is directly irradiated with the second color light beam that is stray light, heat generated by the irradiation can be transported to heat dissipation fin 305 and can be released from heat dissipation fin 305. As a result, a heat dissipation efficiency can be improved.

(Other Exemplary Embodiments)

As described above, the above exemplary embodiment has been described as an example of the techniques disclosed in the present application. However, the techniques in the present disclosure are not limited to the above exemplary embodiment, and can also be applied to embodiments in which change, substitution, addition, omission, and the like are performed. Further, the components described in the above exemplary embodiment can be combined to configure a new exemplary embodiment.

Figure 10:
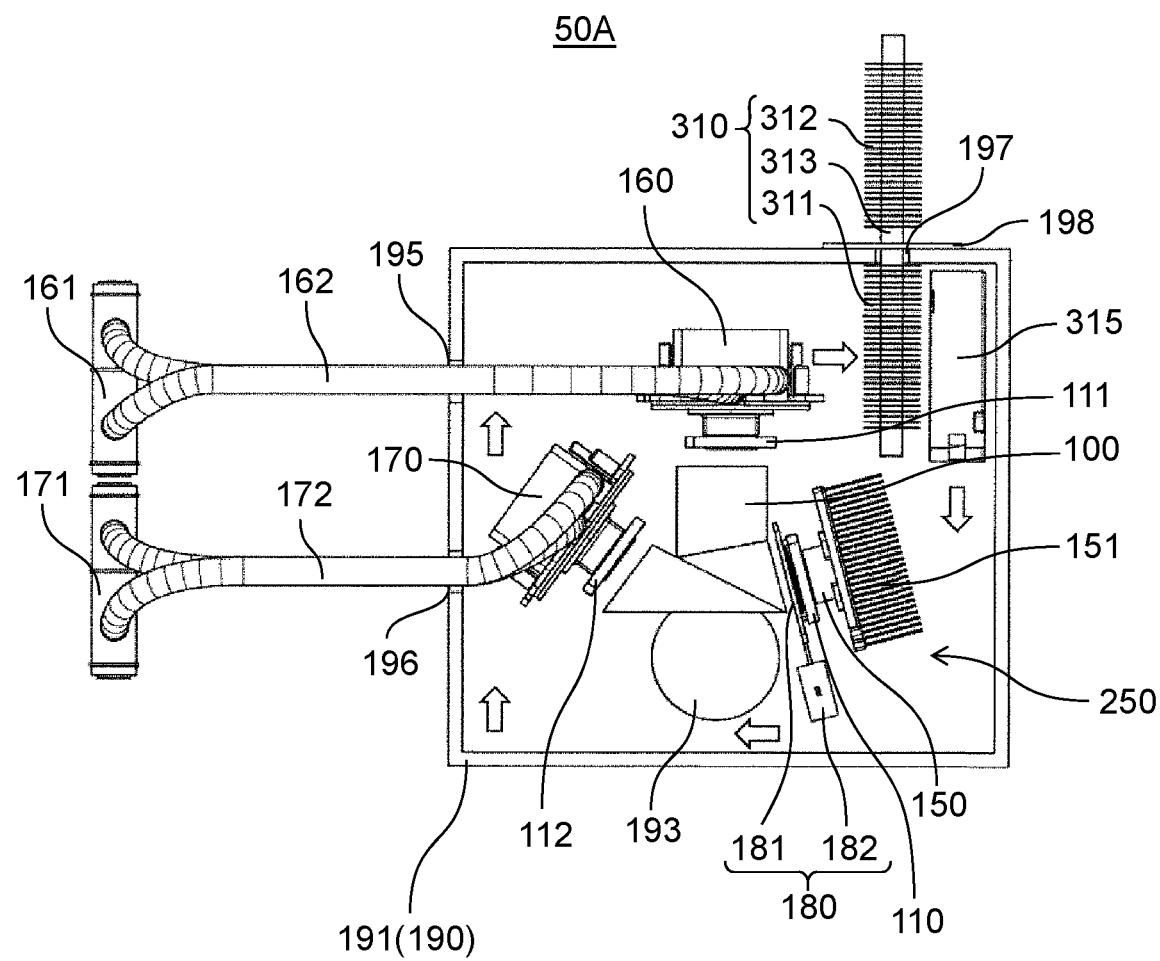
FIG. 10 is a plan view illustrating an image modulator of a modified example when a lid of a container is opened.

In the exemplary embodiment, the heat in container 190 is released into the outside air via the walls of container 190, but the present disclosure is not limited thereto. As illustrated in FIG. 10, image modulator 50A may include: air heat exchanger 310 that exhausts heat in container 190 to an outside of container 190; and air blower 315 that sends air in container 190 to air heat exchanger 310. Image modulator 50A illustrated in FIG. 10 has a configuration in which air heat exchanger 310 and air blower 315 are added to the configuration of image modulator 50 of the exemplary embodiment, and the other components are common.

Air heat exchanger 310 includes heat receiving fin 311 that absorbs heat in container 190, heat dissipation fin 312 that releases the heat of heat receiving fin 311 into the air outside container 190, and heat transport portion 313 that transfers the heat of heat receiving fin 311 to heat dissipation fin 312 through opening 197 provided in container body 191 of container 190. Heat transport portion 313 is, for example, a metal rod having high thermal conductivity, and fixing plate 198 is welded to a central part of the metal rod. Air heat exchanger 310 is fixed to container body 191 of container 190 via fixing plate 198. Air blower 315 circulates the air in container 190. Air discharged from air blower 315 cools first heat dissipator 151 and further cools light shield heat dissipator 182. Air having circulated in container 190 is cooled with its heat absorbed by heat receiving fin 311. The cooled air is sucked by air blower 315 and discharged in container 190 again.

Since the heat in container 190 absorbed by air heat exchanger 310 is transferred to the outside of container 190 and released, a temperature rise in container 190 caused by first heat dissipator 151 and light shield heat dissipator 182 can be reduced. As a result, a temperature rise of each of first display panel 110 to third display panel 112 can be reduced. Air heat exchanger 310 includes, for example, a radiator in the case of liquid cooling, or includes, for example, a plurality of fin tubes in the case of air cooling. When an amount of heat in container 190 can be sufficiently dissipated only by air heat exchanger 310, air blower 315 may be omitted.

Figure 11:
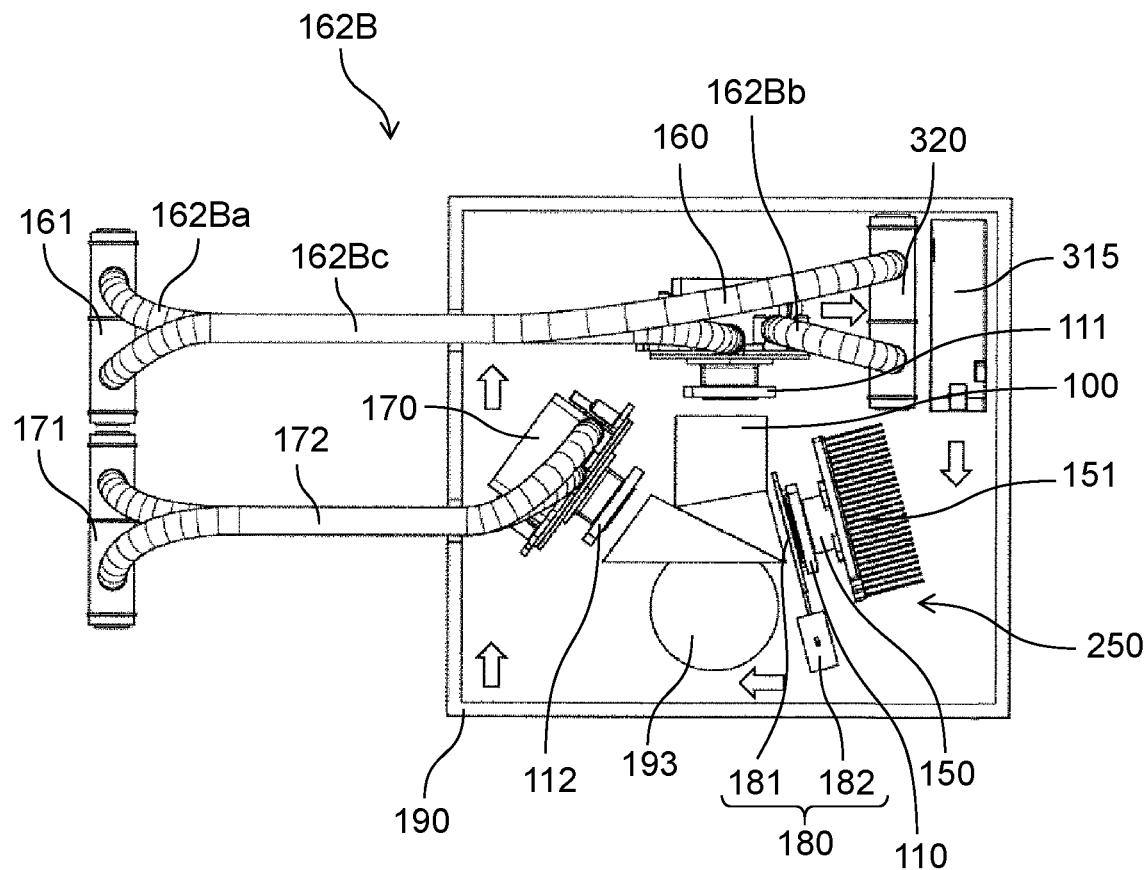
FIG. 11 is a plan view illustrating an image modulator of a modified example when a lid of a container is opened.

As illustrated in FIG. 11, image modulator 50B may include air heat exchanger 320 that discharges the heat in container 190 to second heat dissipator 161 in the outside of container 190. Image modulator 50B illustrated in FIG. 11 has a configuration in which air heat exchanger 320 and air blower 315 are added to the configuration of image modulator 50 of the exemplary embodiment, and the other components are common.

Second heat transport portion 162B circulates a heat medium by a fan or a pump (not shown) between air heat exchanger 320 and each of second heat dissipator 161 and second heat receiver 160. Second heat transport portion 162B includes: pipe 162Ba that sends a refrigerant cooled by second heat dissipator 161 to second heat receiver 160; pipe 162Bb that sends a refrigerant whose temperature has been raised on second heat receiver 160 to air heat exchanger 320; and pipe 162Bc that sends a refrigerant whose temperature has been further raised on air heat exchanger 320 to second heat dissipator 161. The heat medium having absorbed heat from second heat receiver 160 passes through pipe 162Bb, absorbs, on air heat exchanger 320, heat from the air in container 190, passes through pipe 162Bc, and releases heat from second heat dissipator 161. The heat medium whose temperature has dropped returns to second heat receiver 160 through pipe 162Ba.

Air heat exchanger 320 includes, for example, a radiator in the case of liquid cooling, or includes, for example, a plurality of fin tubes in the case of air cooling.

Since the heat medium flowing through air heat exchanger 320 absorbs the heat in container 190 and transfers the heat to second heat dissipator 161 in the outside of container 190 to release heat, it is possible to reduce a temperature rise in container 190 caused by first heat dissipator 151 and light shield heat dissipator 182. As a result, a temperature rise of each of first display panel 110 to third display panel 112 can be reduced. Further, since air heat exchanger 320 releases the heat in container 190 from second heat dissipator 161, air heat exchanger 320 does not need to include a dedicated heat dissipation portion, so that a number of components can be reduced.

As described above, the exemplary embodiments have been described as examples of the techniques in the present disclosure. For that purpose, the accompanying drawings and the detailed description have been provided. Therefore, in order to illustrate the above techniques, the components described in the accompanying drawings and the detailed description can include not only components necessary to solve a problem but also components unnecessary to solve a problem. For this reason, it should not be immediately recognized that those unnecessary components are necessary just because those unnecessary components are described in the accompanying drawings and the detailed description.

In addition, because the above exemplary embodiments are for illustrating the techniques in the present disclosure, various modifications, replacements, additions, removals, or the like can be made without departing from the scope of the accompanying claims or the equivalent thereof.

(Outline of Exemplary Embodiment)

(1) A projection image display device of the present disclosure includes: an optical element that separates incident light into a plurality of different color light beams, and synthesizes the separated color light beams and emits the synthesized color light beams; a first display panel that reflects and modulates the first color light beam separated by the optical element; a second display panel that reflects and modulates the second color light beam; a first heat dissipator that dissipates heat of the first display panel; a second heat dissipator that dissipates heat of the second display panel; a light shielding portion that blocks a part of the second color light beam reflected by the second display panel from traveling toward the first display panel; a light shield heat dissipator that dissipates heat of the light-shielding portion; and a container that hermetically contains the optical element, the first display panel, the second display panel, the light shielding portion, the first heat dissipator, and the light shield heat dissipator, wherein the second heat dissipator is disposed on an outside of the container.

Since the container hermetically contains, as described above, the optical element, the first display panel, the second display panel, the light shielding portion, the first heat dissipator, and the light shield heat dissipator, a dust-proof effect can be obtained. In addition, since the first heat dissipator and the light shield heat dissipator release heat in the container, it is possible to reduce unevenness of the temperature distribution of the first display panel. As a result, in the projection image display device of the present disclosure, it is possible to reduce unevenness of the temperature distribution of the display panel that is irradiated with stray light, and at the same time, it is possible to make the display panel dust proof.

(2) In the projection image display device of (1), the first display panel is disposed between the light shielding portion and the first heat dissipator, the light shielding portion is disposed on an optical element side of the first display panel, and the first heat dissipator and a surface of the first display panel in a direction away from the optical element are coupled. With this configuration, the temperature distribution of the first display panel can become closer to uniform distribution.

(3) In the projection image display device of (1) or (2), the light shield heat dissipator includes: a first light shield heat sink and a second light shield heat sink that dissipate the heat of the light shielding portion; and a heat transport portion that couples the first light shield heat sink and the second light shield heat sink and transports heat of the first light shield heat sink to the second light shield heat sink by using heat transfer with a refrigerant or heat transfer by latent heat. A part of the heat transport portion is disposed along a region that is on the first light shield heat sink and is irradiated with the second color light beam reflected by the second display panel. As a result, since the heat transport portion is directly irradiated with the second color light beam reflected by the second display panel, the heat due to the second color light beam can be transmitted to the second light shield heat sink and can be released from the second light shield heat sink. This configuration makes it possible to improve a heat dissipation efficiency.

(4) The projection image display device according to any one of (1) to (3) includes an air heat exchanger that discharges heat in the container to the outside of the container. This makes it possible to reduce a temperature rise in the container.

(5) The projection image display device according to any one of (1) to (3) includes an air heat exchanger that releases heat in the container from the second heat dissipator.

The present disclosure is applicable to a projection image display device such as a projector.

What is claimed is:

1. A projection image display device comprising:
    an optical element that:
        separates incident light into a first color light beam and a second color light beam,
        synthesizes the first color light beam and the second color light beam to generate synthetic light, and emits the synthetic light;
    a first display panel that reflects and modulates the first color light beam;
    a second display panel that reflects and modulates the second color light beam;
    a first heat dissipator that dissipates heat of the first display panel;
    a second heat dissipator that dissipates heat of the second display panel;
    a light shielding portion that blocks a part of the second color light beam, which has been reflected by the second display panel, from traveling toward the first display panel;
    a light shield heat dissipator that dissipates heat of the light shielding portion; and
    a container that hermetically contains the optical element, the first display panel, the second display panel, the light shielding portion, the first heat dissipator, and the light shield heat dissipator, wherein the second heat dissipator is disposed on an outside of the container.

2. The projection image display device according to claim 1, wherein
    the first display panel is disposed between the light shielding portion and the first heat dissipator,
    the light shielding portion is disposed between the first display panel and the optical element, and
    the first heat dissipator is coupled to the first display panel.

3. The projection image display device according to claim 1, wherein
    the light shield heat dissipator includes:
        a first light shield heat sink that dissipates the heat of the light shielding portion;
        a second light shield heat sink that dissipates the heat of the light shielding portion; and
        a heat transport portion that couples the first light shield heat sink and the second light shield heat sink, and transports heat of the first light shield heat sink to the second light shield heat sink by using (i) heat transfer with a refrigerant or (ii) heat transfer by latent heat, and
    a part of the heat transport portion is disposed along a region that is on the first light shield heat sink and is irradiated with the second color light beam, which has been reflected by the second display panel.

4. The projection image display device according to claim 3, wherein
    the first light shield heat sink includes an opening that the first color light beam passes through, the opening having a first side and a second side orthogonal to the first side, and
    a part of the heat transport portion is disposed along both of the first side and the second side of the opening.

5. The projection image display device according to claim 1, further comprising an air heat exchanger that discharges heat inside the container to the outside of the container.

6. The projection image display device according to claim 1, further comprising an air heat exchanger contained in the container, wherein the second heat dissipator further dissipates heat of the air heat exchanger.

7. The projection image display device according to claim 6, further comprising a heat transport portion that transports the heat of the second display panel and the heat of the air heat exchanger to the second heat dissipator.

8. The projection image display device according to claim 1, further comprising a heat transport portion that transports the heat of the second display panel to the second heat dissipator.

9. The projection image display device according to claim 8, wherein the container includes:
    an opening that the heat transport portion passes through; and
    a seal member that seals the opening.

10. The projection image display device according to claim 1, wherein the optical element separates the incident light into the first color light beam, the second color light beam, and a third color light beam, and synthesizes the first color light beam, the second color light beam, and the third color light beam to generate the synthetic light.

11. The projection image display device according to claim 10, wherein
    the first color light beam is red light,
    the second color light beam is green light, and
    the third color light beam is blue light.

12. The projection image display device according to claim 11, further comprising:
    a third display panel that reflects and modulates the third color light beam; and
    a third heat dissipator that dissipates heat of the third display panel, wherein the third heat dissipator is disposed on the outside of the container.

* * * * *